Jan. 17, 1933.　　　F. H. WINTER　　　1,894,810
SPEED RESPONSIVE SYSTEM
Filed Jan. 2, 1931
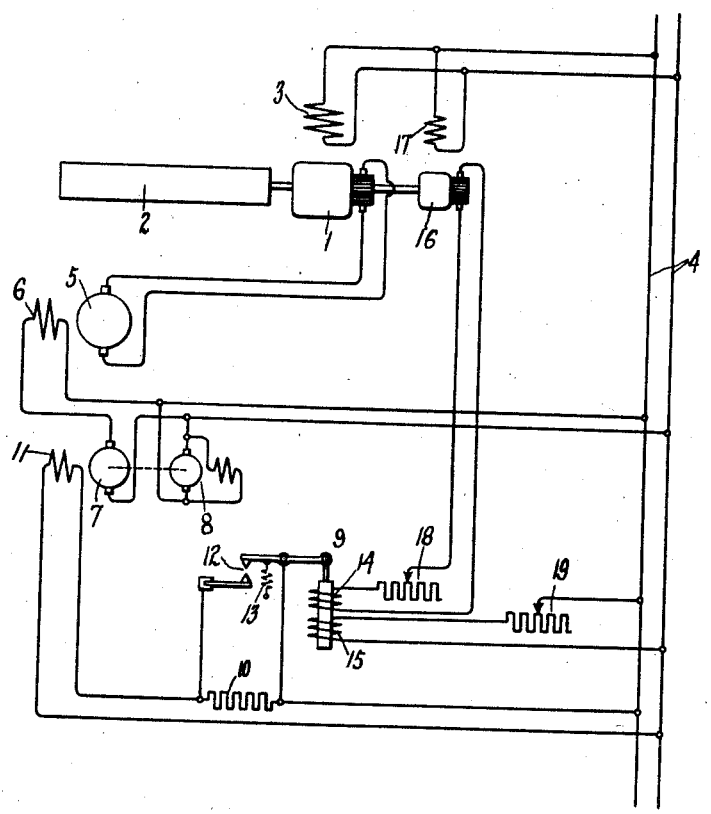
Inventor:
Fred H. Winter,
by Charles E. Tullar
His Attorney.

Patented Jan. 17, 1933

1,894,810

UNITED STATES PATENT OFFICE

FRED H. WINTER, OF SCHENECTADY, NEW YORK, ASSIGNOR TO GENERAL ELECTRIC COMPANY, A CORPORATION OF NEW YORK

SPEED RESPONSIVE SYSTEM

Application filed January 2, 1931. Serial No. 506,015.

My invention relates to speed responsive systems and more particularly to an improved compensated speed regulator which is adapted for use in paper mill drives.

In speed responsive systems of the type in which a tachometer, or pilot, generator produces a voltage whose variations are an index of the speed of a device, it is usually desirable that this voltage should vary in direct proportion to variations in speed. This result may be accomplished by saturating the field of the tachometer generator, for then the generated voltage will vary directly as the speed because the flux is constant. However, complete saturation, which corresponds to zero slope of the magnetization curve of the material of the magnetic circuit, is theoretically unattainable while in most industrial plants the voltage of a supply source of current for separate excitation purposes is neither high enough nor unvarying enough to produce the necessary constant flux in the tachometer generator by saturation. As a result, the response of such systems is adversely affected by variations in the supply circuit voltage.

One way of minimizing trouble of this kind is to provide the supply circuit with voltage regulating means. In cases where it is otherwise unnecessary to have a constant supply voltage such a solution is usually too expensive to be practical.

In accordance with my invention I provide means for compensating a speed responsive system for changes in the voltage of its separately excited pilot generator which are caused by changes in the voltage of the circuit that supplies the separate excitation of this generator.

An object of my invention is to provide a new and improved compensated speed responsive system.

Another object of my invention is to provide means for compensating a speed regulator, which has a separately excited pilot generator, for changes in excitation of said generator.

My invention will be better understood from the following description taken in connection with the accompanying drawing and its scope will be pointed out in the appended claims.

Referring now to the single figure of the accompanying drawing, wherein I have shown diagrammatically an embodiment of my invention as applied to a speed regulator for a paper mill driving motor, 1 is such a motor for driving a paper mill roll 2. This motor has a separately excited field winding 3 which is energized from an ordinary unregulated direct current supply circuit 4. A variable voltage motor control system, known in the art as the Ward Leonard system, may be employed for securing control of the operation of motor 1.

This system, as illustrated, includes a generator 5, which is driven by any suitable source of power, for energizing motor 1. Voltage control of generator 5, and consequently speed control of motor 1, is secured by varying the energization of field winding 6 of generator 5 by means of a small booster generator 7 which is driven by any suitable source of power, such as the small shunt motor 8 shown. Field winding 6 and motor 8 may be energized from any suitable source of current and as shown are connected across supply circuit 4.

A regulator 9 controls the voltage of booster generator 7 through control of the average value of a resistance 10 which is in the circuit of field winding 11 of this generator. This field winding is preferably separately excited and is therefore connected across supply circuit 4.

Regulator 9, which operates on the well known Tirrill principle, has a pair of vibratory contacts 12 which are biased to closed position by a spring 13. When these contacts are together, resistance 10 is short circuited and booster 7 produces its maximum voltage. This means that generator 5 produces its maximum voltage and consequently motor 1 tends to run at maximum speed. In a like manner, when contacts 12 are separated, the booster excitation is low, consequently its voltage and the voltage of generator 5 are minimum and motor 1 tends to run at its slowest speed. Between these limiting values of the ratio of time open to time closed of the contacts 12 are an infinite number of intermediate values of this ratio to each of which corresponds a different average value of resistance 10 with respect to the circuit of booster field winding 11. In this way the speed of motor 1 may be accurately regulated by controlling the vibratory action of contacts 12.

I achieve this control of the contacts by producing a compound or resultant effect, tending to separate the contacts, which is composed of two oppositely acting components, one of which varies in proportion to variations in the voltage of a separately excited pilot generator 16 which is driven by the mill motor 1, and the other of which varies in proportion to variations in the voltage of the source of separate excitation for this pilot generator.

The preferred way of securing this control is to associate two coils, a main coil 14 and a compensating coil 15, with one of the contacts 12 in such a manner that an increase in their net energization above a certain value tends to open contacts 12 against spring 13. Main coil 14 is connected to pilot generator 16. This generator has its field 17 highly excited by supply circuit 4. Compensating coil 15 is connected across supply circuit 4 in such a way that its magnetomotive force opposes that of coil 14. If now the voltage of circuit 4 is constant the net effect of both coils will vary in direct proportion to variations in the speed of motor 1 because the voltage of generator 16 will be influenced solely by its speed, which is the speed of motor 1. Under such conditions coil 15 would not be necessary. However, if the voltage of circuit 4 varies the voltage of generator 16 will also vary to a certain extent because as field 17 can not be completely saturated some change in flux will be produced. Therefore, the energization of coil 14 will no longer vary in proportion to speed variations. Coil 15, however, compensates for this. Thus, suppose the voltage of circuit 4 increases. This will cause an increase in voltage of generator 16 which in turn causes an increase in energization of coil 14. However, the same increase in voltage of circuit 4 causes an increase in energization of coil 15 and this increase may be made to cancel the increase in excitation of coil 14. This same cancellation will obviously also take place when the voltage of circuit 4 decreases. Therefore, regardless of the voltage of circuit 4, the net effect of coils 14 and 15 will vary only with variations in speed.

It will be obvious to those skilled in the art that my invention is not limited to the particular compensating scheme shown and that voltage cancellation instead of magnetomotive force cancellation might also be employed for compensating purposes without departing from my invention in its broader aspects. The illustrated arrangement is preferred as it gives the best compensation at all speeds.

Variable resistances 18 and 19 are connected respectively in series with coils 14 and 15 so that adjustment may be made for various normal speeds and normal voltages of circuit 4.

The operation of the system is as follows. As the net effect or pull of coils 14 and 15 is independent of the voltage of circuit 4 and varies only in proportion to the speed of generator 16, an increase in speed above normal will cause contacts 12 to separate which will result in a decrease in the energization, and hence speed, of motor 1, as explained above. As soon as the speed falls below normal the net energization of coils 14 and 15 will be weakened and spring 3 will close contacts 12 thereby increasing the speed of motor 1. This action is very rapid and results in holding a constant normal speed of motor 1.

While I have shown and described a particular embodiment of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:—

1. In combination, an electric generator, variable voltage means connected to energize the field winding of said generator, and means responsive to the joint effects of the voltage of said generator and the voltage applied to the field winding of said generator for producing a resultant effect which is proportional to the speed of said generator and which is independent of the voltage of said variable voltage means.

2. In combination, a separately excited pilot generator, variable voltage means for exciting said generator, and means jointly responsive to the voltage of said generator and to the voltage of said means for producing a resultant effect which is proportional to the speed of said generator and which is independent of the voltage of said variable voltage means.

3. In combination, a separately excited generator, a variable voltage source for exciting said generator near saturation, and means responsive to the opposed effects of the voltage of said generator and the voltage of said source for producing an effect which is proportional to the speed of said generator and which is independent of the voltage of said source.

4. In combination, a separately excited pilot generator, a variable voltage source of current for energizing the field winding of said generator, and means for producing an operating effect which is proportional to the speed of said generator and which is independent of the voltage of said source including an electromagnetic device having a pair of operating coils which are connected respectively to said generator and said source in such a manner that their magneto-motive forces are in opposition.

5. In combination, a separately excited variable speed generator, a source of current supply subjected to voltage fluctuations for providing the separate excitation for said generator, a device connected to be responsive to the voltage of said generator, and means for compensating said device for voltage changes of said generator which are due to the voltage fluctuations of said source whereby said device responds only to voltage changes of said generator which are produced by speed changes of said generator.

6. In combination, a variable speed generator, a variable voltage source for separately exciting said generator, a control device, means responsive to the voltage of said generator for actuating said device, and means responsive to the voltage of said source for neutralizing the portion of the actuating effect of said actuating means which is produced by voltage variations of said variable voltage source as distinguished from the actuating effect of said actuating means which is produced by variations in speed of said generator.

7. In combination, a variable speed generator, a supply circuit which is subjected to voltage fluctuations, a field winding for said generator connected to be energized from said circuit, and means for producing an operating effect which is dependent on the voltage of said generator and which is independent of the voltage fluctuations of said circuit including a pair of opposed coils which are energized by said generator and by said circuit respectively.

8. In combination, a pilot generator, a variable voltage source for separately exciting said generator, a regulator, a normally energized operating coil for said regulator directly connected to respond to the voltage of said generator, and a compensating coil for compensating said operating coil for changes in its energization resulting from changes in the voltage of said source, said compensating coil being energized from said source.

In testimony whereof, I have hereto set my hand this 30th day of December, 1930.

FRED H. WINTER.